US009255588B2

(12) United States Patent
Amrhein

(10) Patent No.: US 9,255,588 B2
(45) Date of Patent: Feb. 9, 2016

(54) FLOW REGULATING VALVE SUBASSEMBLY

(71) Applicant: Robert Bosch GmbH, Stuttgart (DE)

(72) Inventor: Jan Amrhein, Simpsonville, SC (US)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 14/256,908

(22) Filed: Apr. 18, 2014

(65) Prior Publication Data

US 2014/0312250 A1  Oct. 23, 2014

(30) Foreign Application Priority Data

Apr. 18, 2013  (DE) .......................... 10 2013 206 977

(51) Int. Cl.
| F16K 31/12 | (2006.01) |
| F15B 13/042 | (2006.01) |
| F15B 13/04 | (2006.01) |
| F15B 13/043 | (2006.01) |
| F16K 31/122 | (2006.01) |

(52) U.S. Cl.
CPC ......... *F15B 13/0426* (2013.01); *F15B 13/0405* (2013.01); *F15B 13/0433* (2013.01); *F16K 31/122* (2013.01)

(58) Field of Classification Search
CPC ............. F15B 13/0405; F15B 13/0433; F15B 13/0426; F16K 31/122
USPC ................................ 251/28, 29, 30.01–30.05
See application file for complete search history.

(56) References Cited

U.S. PATENT DOCUMENTS 3,981,478 A * 9/1976 Lundsgart ............. F16K 31/363
                                                        251/29
4,311,296 A * 1/1982 Scheffel ............. F15B 13/0405
                                                        251/29
(Continued)

FOREIGN PATENT DOCUMENTS

DE         38 21 849 A1   1/1990
DE         34 46 945 C2   12/1994
(Continued)

OTHER PUBLICATIONS

German Search Report corresponding to DE 10 2013 206 977.4, mailed Jan. 7, 2014 (5 pages).

*Primary Examiner* — John K Fristoe, Jr.
*Assistant Examiner* — Umashankar Venkatesan
(74) *Attorney, Agent, or Firm* — Maginot, Moore & Beck LLP

(57) ABSTRACT

A flow regulating valve subassembly includes a main valve configured as a seat valve and a valve piston. The valve piston is acted upon via a first end face by the pressure of a first working connection and via an annular surface of the valve piston by the pressure of a second working connection in the opening direction. The valve piston is also acted upon in the closing direction via a second end face by the pressure of the higher-pressure working connection. An adjustable throttle is formed between a housing of the main valve and the valve piston. The throttle has a cross section that changes continuously during displacement of the valve piston and connects the higher-pressure working connection to the second end face. A pilot control valve arrangement is configured to control a control line which connects the second end face to the lower-pressure working connection.

13 Claims, 1 Drawing Sheet

(56) References Cited

U.S. PATENT DOCUMENTS

| | | | |
|---|---|---|---|
| 4,476,893 A * | 10/1984 | Schwelm | G05D 7/005 137/486 |
| 4,779,836 A | 10/1988 | Marklund | |
| 6,409,142 B1 * | 6/2002 | Kariya | F15B 11/003 137/460 |
| 6,691,510 B2 * | 2/2004 | Kariya | F15B 11/003 60/403 |
| 7,040,215 B2 * | 5/2006 | Bruck | B66F 9/22 91/435 |
| 2010/0155633 A1 | 6/2010 | Pfaff | |

FOREIGN PATENT DOCUMENTS

| | | |
|---|---|---|
| DE | 101 02 409 A1 | 7/2002 |
| WO | 2007/149192 A2 | 12/2007 |

* cited by examiner

FLOW REGULATING VALVE SUBASSEMBLY

This application claims priority under 35 U.S.C. §119 to patent application no. DE 10 2013 206 977.4 filed on Apr. 18, 2013 in Germany, the disclosure of which is incorporated herein by reference in its entirety.

BACKGROUND

The disclosure relates to a flow regulating valve subassembly.

A control valve subassembly of this type is known from U.S. Pat. No. 4,779,836. It comprises a housing 1, in which a valve piston 13 is accommodated linearly movably. Provided on the housing are a first and a second working connection 2; 3 which are connected to one another via a valve seat on the housing. The valve seat can be closed by the valve piston by means of a first end face 14, while the opposite second end face 16, acting in the closing direction, of the valve piston 13 delimits, together with the housing, a valve space 17. Between the housing and the valve piston, an adjustable throttle 18 is provided, the throttle cross section of which changes continuously during displacement of the valve piston 13. For this purpose, notches 18 which run in the direction of the valve piston axis and the depth of which changes continuously are provided on the circular-cylindrical outer circumferential surface of the valve piston 13. The notches 18 are designed such that, when the valve piston 13 sealingly closes the valve seat, a residual throttle cross section remains, so that there is always a fluid connection between the first working connection 2 and the valve space 17.

In the stationary state of the valve subassembly, the position of the valve piston 13 is set such that the force which the pressure in the valve space 17 exerts upon the second end face 16 is equal to the force which the pressures of the first and of the second working connection 2, 3 exert in the opening direction upon the valve piston 13. The pressure of the first working connection 2 acts in this case upon a central circular surface 14, while the pressure of the second working connection 3 acts upon a surrounding annular surface 15. The circular surface 14 and the annular surface 15 are delimited with respect to one another by the valve seat.

The pressure in the valve space 17 arises from the pressure of the first working connection 2, reduced by the amount of the pressure drop in the throttle 18 to which the fluid is delivered via the duct 19 arranged in the valve piston 13. The pressure drop of the throttle 18 arises from the volume flow which flows via the throttle 18. This volume flow is equal to the control volume flow which flows out of the valve space 17 via a pilot control valve 26 to the second working connection 2. The variable 5 throttle cross section, which increases essentially in proportion to the opening of the valve piston 13, has the effect that the said control volume flow is proportional to the main volume flow which flows from the first working connection 2 to the second working connection 3. Since the control volume flow is markedly lower than the main volume flow, the present valve subassembly is a volume flow intensifier. For the sake of completeness, reference may also be made of the nonreturn valves 21; 22; 27; 28 which enable the valve subassembly also to be operated with an opposite main flow direction, that is to say from the second working connection 3 to the first working connection 2.

The pilot control valve 26 is often activated electrically, a desirable operating behavior of the flow regulating valve subassembly being one in which the main volume flow depends solely on the activation signal of the pilot control valve 26, so that a volume flow actuator is obtained. However, this is only approximately the case, since the control volume flow depends not only on the position of the pilot control valve 26, but also on the pressure drop at the pilot control valve 26, this pressure drop depending, in turn, on the pressure of the first working connection 2.

This dependence can be compensated via pressure sensors which have to be of highly accurate design and are consequently costly.

Furthermore, this effect can be eliminated partially by load compensation of the pilot control valve by means of a pressure balance. The flow regulating valve subassembly nevertheless is still dependent upon the pressures in the working connections.

The object of the present disclosure is to provide a flow regulating valve subassembly in which accurate determination of the main volume flow is always made possible.

SUMMARY

This object is achieved by means of a flow regulating valve subassembly having the features of the disclosure.

The flow regulating valve subassembly has a housing, in which a valve piston is accommodated linearly movably, there being provided in the housing a first and a second working connection which are connectable to one another via a valve seat on the housing. A main volume flow can thereby be set. The valve piston is acted upon, via a first end face arranged on the valve seat, by the pressure of the first working connection in the opening direction and, via an annular surface of the valve piston, by the pressure of the second working connection likewise in the opening direction. Furthermore, the valve piston is acted upon in the closing direction, via a second end face, by the pressure of the higher-pressure working connection which therefore acts as an inlet connection. In this case, the second end face delimits with the housing a valve space. Between the housing and the valve piston, an adjustable throttle is formed, the cross section of which changes continuously during displacement of the valve piston, the higher-pressure working connection being connected to the valve space via the throttle. Furthermore, a pilot control valve arrangement is provided, via which a control line can be controlled (opened), which connects the valve space to the lower-pressure working connection which therefore acts as an outlet connection. According to the disclosure, the pilot control valve arrangement has a fixed displacement diaphragm and a continuously adjustable 2/2-way valve which acts as a pressure balance, the valve body of which is acted upon in the closing direction by a control pressure, picked off upstream of the fixed displacement diaphragm, of the control line and in the opening direction by an actuator and by a control pressure, picked off downstream of the fixed displacement diaphragm, of the control line. Furthermore, a position detection means for detecting the displacement travel or the position of the valve body of the 2/2-way valve is provided. The fluid flow from the valve space to the lower-pressure working connection which therefore acts as an outlet connection can be determined arithmetically from the set force of the actuator of the pressure balance and from the position of the valve body of the pressure balance, and from this the pressure difference between them can be determined. The position of the valve piston and therefore the main volume flow from the higher-pressure to the lower-pressure working connection can be calculated from this with markedly improved accuracy.

The position detection means may be a travel sensor. The position detection means may be optical, inductive or capacitive.

Further advantageous refinements of the disclosure are described in the dependent patent claims.

According to a first preferred exemplary embodiment, the actuator is an electromagnet, the activation signal of which is current or voltage.

In this case, it is especially preferable if the inductance of the electromagnet can be determined by the position detection means. The flow regulating valve subassembly according to the disclosure is consequently especially cost-effective, since only current and voltage of the electromagnet have to be known.

According to a second exemplary embodiment, the actuator is a spring with variable prestress. Setting may take place electrically, hydraulically or electrohydraulically.

If the valve body of the 2/2-way valve is additionally acted upon in the closing direction by a spring, the reliability of the flow regulating valve subassembly is increased since it closes without activation.

In terms of apparatus, it is simple if the higher-pressure working connection is connectable or connected to the throttle via a duct arrangement accommodated in the valve piston.

In an especially preferred development, at the same time, in each case the higher-pressure working connection is connected to the throttle via the duct arrangement of the two working connections, while the other working connection is shut off with respect to the throttle.

Then, according to a first variant, a further pilot control valve arrangement is provided, via which a further control line also from the valve space to the other working connection can be controlled (opened), the further pilot control valve arrangement being constructed, in principle, in the same way as that mentioned first. It therefore also has a fixed displacement diaphragm and a continuously adjustable 2/2-way valve acting as a pressure balance. The valve body of the said 2/2-way valve is acted upon in the closing direction by a control pressure, picked off upstream of the fixed displacement diaphragm, of the control line and in the opening direction by an actuator and by a control pressure, picked off downstream of the fixed displacement diaphragm, of the control line. This ensures that the valve space is always connected to the lower-pressure working connection via the respective pilot control valve arrangement. The flow can then also pass through both working connections in the opposite direction, so that the flow regulating valve subassembly according to the disclosure functions bidirectionally.

Preferably, in this case, a common control line and a branch are provided upstream of the two pilot control valve arrangements, so that only one outlet (for example, bore) out of the valve space is obtained.

Preferably, the further pilot control valve arrangement is configured structurally identically to the first pilot control valve arrangement. Identical parts and a lower diversity of parts are consequently obtained.

According to a second variant, a branch and two branch lines in or of the control line, each of which issues into one of the working connections, are provided downstream of the pilot control valve arrangement. A nonreturn valve closing from the respective working connection to the branch is provided in each branch line. This ensures that the valve space is always connected to the lower-pressure working connection via the pilot control valve arrangement. The flow can then also pass through the two working connections in the opposite direction, so that the flow regulating valve subassembly according to the disclosure functions bidirectionally.

The duct arrangement may have a first inlet, formed at the valve piston, in the region of the first working connection, a second inlet, formed at the valve piston, in the region of the second working connection, a shuttle valve and an issue, formed at the valve piston, into the throttle formed as a notch or notches.

Differingly, the duct arrangement may also have two separate ducts which have in each case an issue into the throttle formed as a notch or notches, there being arranged in each duct a nonreturn valve opening from the respective working connection to the throttle.

Both embodiments of the duct arrangement ensure that in each case the higher-pressure working connection is connected to the valve space via the throttle. The flow can then also pass through the two working connections in the opposite direction, so that the flow regulating valve subassembly according to the disclosure functions bidirectionally.

The fixed displacement diaphragm may be arranged upstream or downstream of the 2/2-way valve in the control line.

In order to protect the valve space, a pressure limiting valve opening from the valve space to the second working connection may be provided in the valve piston. This avoids the need for a further large pressure limiting valve.

In order to prevent cavitation and avoid a large tank suction valve, a nonreturn valve opening from the valve space to the first working connection may be provided in the valve piston.

In one application of the flow regulating valve subassembly according to the disclosure, the higher-pressure working connection is connected to a load, while a tank is connected to the lower-pressure working connection.

BRIEF DESCRIPTION OF THE DRAWINGS

Various exemplary embodiments of the disclosure are described in detail below by means of the figures in which.

DETAILED DESCRIPTION

Figure 1:
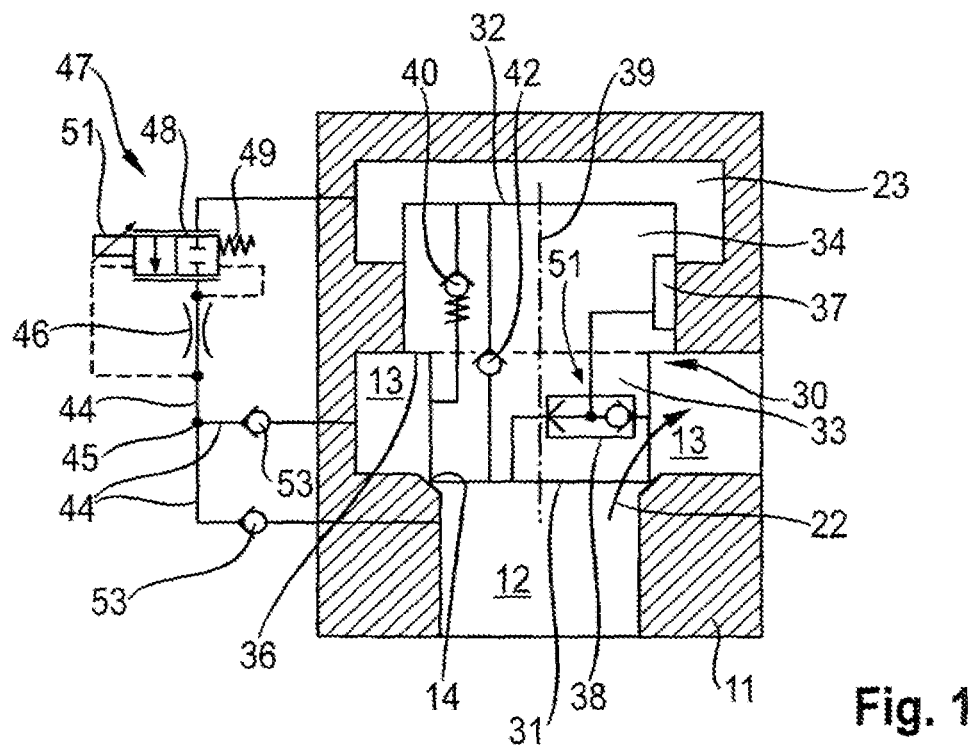
FIG. 1 shows a first exemplary embodiment of a flow regulating valve subassembly according to the disclosure in a diagrammatic illustration.
Figure 2:
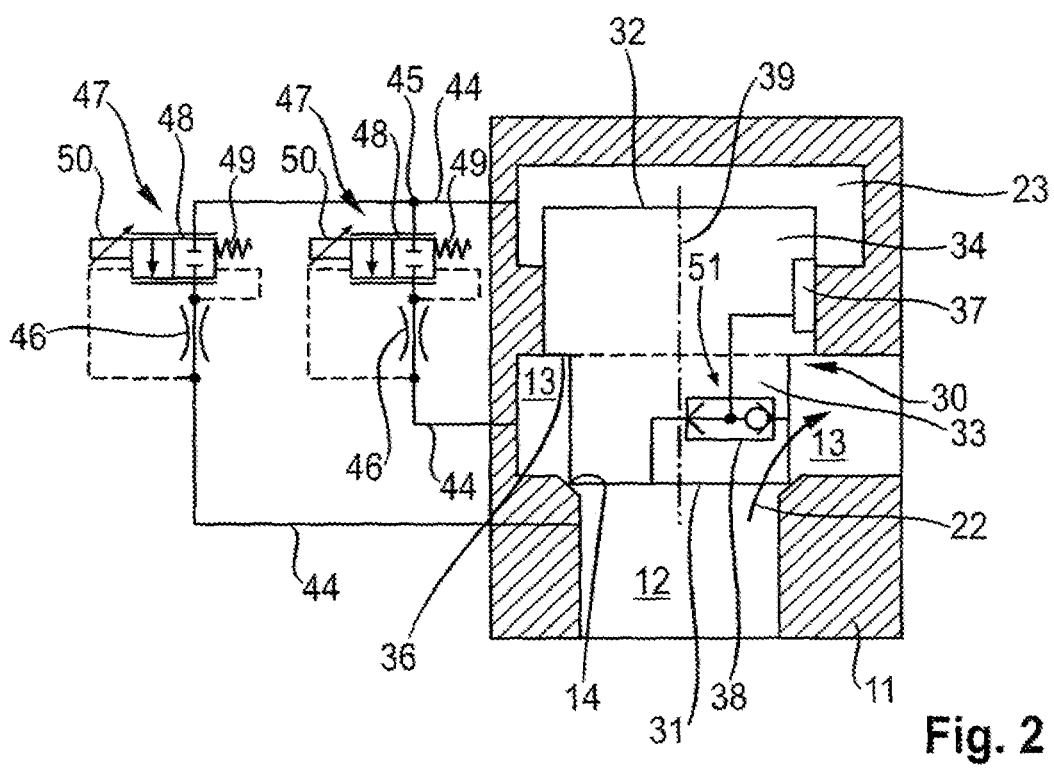
FIG. 2 shows a second exemplary embodiment of a flow regulating valve subassembly according to the disclosure in a diagrammatic illustration.

FIGS. 1 and 2 show in each case an exemplary embodiment of a flow regulating valve subassembly according to the disclosure. It comprises a housing 11, in which a valve piston 30 is accommodated linearly movably. The valve piston 30 is designed essentially in the form of a step cylinder with a first and a second circular-cylindrical portion 33; 34. Provided in the housing 11 is a valve seat 14 which is intended to come to bear with the first end face 31 of the valve piston 30 against the first cylindrical portion 33, so that the valve seat 14 can be closed sealingly by the valve piston 30. Provided in the housing 11 are a first and a second working connection 12; 13 which are connected to one another via the valve seat 14. The flow regulating valve subassembly is intended for setting a main volume flow 22 which flows either from the first to the second working connection 12, 13 or vice versa.

The pressure of the first working connection 12 acts upon the circular first end face 31 on the first cylindrical portion 33 which has the smaller diameter of the two cylindrical portions 33; 34. By contrast, the pressure of the second working connection 13 acts upon the annular surface 36 at the transition between the first and the second cylindrical portion 33; 34. The two pressures mentioned are connected to a continuously adjustable throttle 37 via a duct arrangement 51 having a shuttle valve 38, so that the in each case higher pressure prevails at the throttle 37.

The continuously adjustable throttle 37 is formed by a plurality of slots or notches 37 on the outer circumferential surface of the second cylindrical portion 34, which run in the direction of the valve piston axis or cylinder axis 39 and of which only one slot 37 is illustrated in each of FIGS. 1 and 2. The slots 37 are arranged such that a residual throttle cross section remains between the valve piston 30 and the housing 11, even when the valve piston 30 sealingly closes the valve seat 14. If, then, the valve piston 30 is displaced upward in FIGS. 1 and 2 in order to release the valve seat 14, the throttle cross section widens essentially in proportion to the displacement of the valve piston 30. The same applies to the opening cross section of the valve seat 14.

The second end face 32 lying opposite the first end face 31 delimits together with the housing 11 a valve space 23.

FIG. 1 shows a pressure limiting valve 40 arranged in the valve piston 30 and opening from the valve space 23 to the second working connection 13. The said pressure limiting valve is designed as a spring-prestressed nonreturn valve. In order to prevent cavitation, a nonreturn valve 42 opening from the valve space 23 to the first working connection 12 is provided in the valve piston 30 and opens if the pressure in the valve space 23 were to fall below that of the first working connection 12.

According to the disclosure, pilot control with a control line and with a pressure balance is provided. A spring and the pressure upstream or in front of a fixed displacement diaphragm act in the closing direction. A force of an electromagnet and the pressure downstream or behind the fixed displacement diaphragm act in the opening direction. The pressure balance itself may be arranged upstream or downstream with respect to the fixed displacement diaphragm.

More specifically, in the first exemplary embodiment according to FIG. 1, a branched control line 44 is provided, which is connected on the inlet side to the valve space 23 and which has a branch 45 which is connected to the two working connections 12, 13 in each case via a branch line 46. Upstream or in front of the branch 45 is arranged a fixed displacement diaphragm 46 with a 2/2-way valve 47 acting as a pressure balance. A nonreturn valve 53 opening from the valve space 23 to the respective working connection 12, 13 is provided in each branch line downstream of or behind the branch 45.

In the second exemplary embodiment according to FIG. 2, a branched control line 44 is likewise provided, which is connected on the inlet side to the valve space 23 and has a branch 45 which is connected to the two working connections 12, 13 in each case via a branch line 46. A fixed displacement diaphragm 46 with a 2/2-way valve 47 acting as a pressure balance is arranged in each branch line downstream of or behind the branch 45.

The following text applies (again) to both exemplary embodiments according to FIGS. 1 and 2: a valve body 48 of the 2/2-way valve or of the pressure balance 47 is acted upon in the closing direction by a spring 49 and by the pressure downstream or in front of the fixed displacement diaphragm 46. The valve body 48 of the pressure balance 47 is acted upon in the opening direction by the pressure upstream of or behind the fixed displacement diaphragm 46 and by an electromagnet 50. The 2/2-way valve may be arranged upstream or downstream with respect to the fixed displacement diaphragm. When the electromagnet 50 is actuated, the pressure balance 47 is deflected counter to the spring 49 and a connection from the valve space 23 to the working connection 12, 13 is made. A volume flow flows via the pilot control and generates a pressure drop across the fixed displacement diaphragm 47. This pressure drop has the effect that the valve body 48 of the pressure valve 47 is pushed in the closing direction. The valve body 48 of the pressure balance 47 therefore no longer stands in the position in which it would stand if only the forces of the electromagnet 50 and of the spring 49 were to act upon it. The current position of the pressure balance 47 is therefore a measure of the volume flow via the pilot control.

This is followed by an example: the electromagnet 50 is actuated and sets a constant force of 1N. The spring 49 has a spring value of 1 N/mm, that is to say the pressure balance 47 may have a stroke of 1 mm. It is assumed that the pressure difference between the valve space 23 and the lower-pressure working connection 13 is relatively small. By virtue of the opening of the pressure balance 47 and this pressure difference, a relatively low volume flow would be set in the pilot control.

This volume flow then generates a pressure difference which pushes the pressure balance 47 somewhat further shut. In the example, the pressure balance is displaced to 0.9 mm. If, then, the pressure difference between the two working connections 12, 13 rises, the volume flow via the pilot control through the control line 44 also rises. This leads to an increase in the pressure difference across the fixed displacement diaphragm 46 and therefore to a further pushing shut of the pressure balance 47, for example, to 0.5 mm.

According to the disclosure, by a force of the electromagnet 50 being set and by the resulting pressure balance stroke being measured, the volume flow via the pilot control can be determined unequivocally.

All the important variables in the pilot control are therefore known:

volume flow via the pilot control $Q_{23/13}$ pressure drop across the fixed displacement diaphragm 46 stroke of the valve body 48 of the pressure balance 47.

By means of these known variables, then, the pressure difference between the valve space 23 and working connection 13 can be deduced again. This pressure difference can be determined unequivocally via the diaphragm equation. According to this:

$$\Delta p_{23/13} = [Q_{23/13}/K^* A_{\mathit{eff}}]^2,$$

$A_{\mathit{eff}}$ being the effective cross-sectional area of the fixed displacement diaphragm 46 and of the diaphragm of the pressure balance 47.

By means of $\Delta p_{23/13}$, the pressure difference $\Delta p_{12/23}$ is also known via the balance of forces of the main valve piston 30.

The stroke of the main valve piston 30 can be deduced, in turn, by means of this pressure difference $\Delta p_{12/23}$ and the pilot control volume flow $Q_{23/13}$.

By the force of the electromagnet 50 being set and by the resulting stroke of the valve body 48 of the pressure balance 47 being measured, all the system variables are known:

main volume flow 22 across the main edge pressure difference across the main edge stroke of the main valve piston 30.

A flow regulating valve subassembly with a main valve designed as a seat valve is disclosed. The valve piston of the latter is acted upon, via a first end face arranged on the valve seat, by the pressure of a first working connection and, via an annular surface of the valve piston, by the pressure of a second working connection likewise in the opening direction. Furthermore, the valve piston is acted upon in the closing direction, via a second end face, by the pressure of the higher-pressure working connection which therefore acts as an inlet connection. Between a housing of the main valve and the valve piston, an adjustable throttle is formed, the cross section of which changes continuously during displacement of the valve piston, the higher-pressure working connection being connected to the second end face via this throttle. Furthermore, a pilot control valve arrangement is provided, via which a control line can be controlled (opened), which connects the second end face to the lower-pressure working connection which therefore acts as an outlet connection. The pilot control valve arrangement has a fixed displacement diaphragm and a continuously adjustable 2/2-way valve which acts as a pressure balance which is acted upon in the closing direction by a control pressure, picked off upstream of the fixed displacement diaphragm, of the control line and in the opening direction by an actuator and via a control pressure, picked up downstream of the fixed displacement diaphragm, of the control line. Furthermore, a position detection means for detecting the displacement travel or the position of the valve body of the 2/2-way valve is provided.

LIST OF REFERENCE SYMBOLS 11 housing
12 first working connection
13 second working connection
14 valve seat
22 main volume flow
23 valve space
30 valve piston
31 first end face
32 second end face
33 first cylindrical portion
34 second cylindrical portion
35 circular surface
36 annular surface
37 throttle
38 shuttle valve
39 cylinder axis
40 pressure limiting valve
42 nonreturn valve
44 control line
45 branch
46 fixed displacement diaphragm
47 2/2-way valve
48 valve body
49 spring
50 electromagnet
51 duct arrangement
53 nonreturn valve

What is claimed is:

1. A flow regulating valve subassembly, comprising:
a housing having a valve seat, the housing including a first working connection and a second working connection that are connectable to one another via the valve seat on the housing;
a valve piston linearly movably accommodated in the housing, the valve piston being acted upon (i) via a first end face by the pressure of the first working connection in the opening direction, (ii) via an annular surface by the pressure of the second working connection in the opening direction, and (iii) via a second end face by the pressure of the higher-pressure working connection in the closing direction, the second end face and the housing delimiting a valve space;
an adjustable throttle formed by the housing and the valve piston, the adjustable throttle having a cross section that changes continuously during displacement of the valve piston, the higher-pressure working connection being connected to the valve space via the throttle; and
a pilot control valve arrangement arranged in a control line connecting the valve space to the lower-pressure working connection,
wherein the pilot control valve arrangement has a fixed displacement diaphragm and a continuously adjustable 2/2-way valve with a valve body, the valve body (i) being acted upon in the closing direction by a control pressure, picked off upstream of the fixed displacement diaphragm, of the control line, (ii) being acted upon in the opening direction by an actuator and by a control pressure, picked off downstream of the fixed displacement diaphragm, of the control line, and (iii) having a position configured to be detected via a position detection mechanism.

2. The flow regulating valve subassembly according to claim 1, wherein the actuator is configured as an electromagnet, the actuator having an activation signal configured as current or voltage.

3. The flow regulating valve subassembly according to claim 2, wherein the inductance of the electromagnet is determined by the position detection mechanism.

4. The flow regulating valve subassembly according to claim 1, wherein the actuator is a spring with variable prestress.

5. The flow regulating valve subassembly according to claim 1, wherein the 2/2-way valve is acted upon in the closing direction by a spring.

6. The flow regulating valve subassembly according to claim 1, wherein the higher-pressure working connection is configured to be connected to the throttle via a duct arrangement accommodated in the valve piston.

7. The flow regulating valve subassembly according to claim 6, wherein the higher-pressure working connection is always connected to the throttle via the duct arrangement of the two working connections, while the other working connection is shut off with respect to the throttle.

8. The flow regulating valve subassembly according to claim 7, further comprising a further control line or a branch of the control line, via which the valve space is also connectable to the other working connection via a further pilot control valve arrangement, the further pilot control valve arrangement also having a fixed displacement diaphragm and a continuously adjustable 2/2-way valve with a valve body, the valve body being acted upon (i) in the closing direction by a control pressure, picked off upstream of the fixed displacement diaphragm, of the control line or of the branch and (ii) in the opening direction by an actuator and by a control pressure, picked off downstream of the fixed displacement diaphragm, of the control line or of the branch.

9. The flow regulating valve subassembly according to claim 7, further comprising a branch and two branch lines of the control line, each of which issues into one of the working connections, being arranged downstream of the pilot control valve arrangement, the branch lines each including a nonreturn valve closing from the respective working connection to the branch.

10. The flow regulating valve subassembly according to claim 6, wherein the duct arrangement has a first inlet formed at the valve piston in the region of the first working connection, a second inlet formed at the valve piston in the region of the second working connection, a shuttle valve and an issue, formed at the valve piston, into the throttle formed as a notch or notches.

11. The flow regulating valve subassembly according to claim 1, wherein the fixed displacement diaphragm is arranged downstream of the 2/2-way valve in the control line.

12. The flow regulating valve subassembly according to claim 1, wherein the valve piston includes a pressure limiting valve opening from the valve space to the second working connection.

13. The flow regulating valve subassembly according to claim 1, wherein the valve piston includes a nonreturn valve opening from the valve space to the first working connection.

* * * * *